(12) United States Patent
Aitken

(10) Patent No.: US 7,323,426 B2
(45) Date of Patent: Jan. 29, 2008

(54) HIGH STRAIN POINT GLASSES

(75) Inventor: Bruce G. Aitken, Corning, NY (US)

(73) Assignee: Corning Incorporated, Corning, NY (US)

( * ) Notice: Subject to any disclaimer, the term of this patent is extended or adjusted under 35 U.S.C. 154(b) by 256 days.

(21) Appl. No.: 11/026,370

(22) Filed: Dec. 30, 2004

(65) Prior Publication Data

US 2005/0142364 A1 Jun. 30, 2005

Related U.S. Application Data

(60) Provisional application No. 60/533,765, filed on Dec. 30, 2003.

(51) Int. Cl.
*C03C 3/097* (2006.01)

(52) U.S. Cl. .............. 501/63; 501/53; 501/54

(58) Field of Classification Search .............. 501/63
See application file for complete search history.

(56) References Cited

U.S. PATENT DOCUMENTS

| | | | | |
|---|---|---|---|---|
| 2,200,958 | A | | 5/1940 | Krefft et al. .............. 106/36.1 |
| 3,357,876 | A | | 12/1967 | Rinehart et al. .............. 161/1 |
| 4,055,703 | A | * | 10/1977 | Rinehart .............. 428/410 |
| 4,550,087 | A | | 10/1985 | Kerko et al. .............. 501/13 |
| 4,604,791 | A | * | 8/1986 | Todorof .............. 438/62 |
| 4,634,683 | A | | 1/1987 | Dumbaugh .............. 501/32 |
| 4,634,684 | A | | 1/1987 | Dumbaugh .............. 501/69 |
| 4,798,768 | A | * | 1/1989 | Oversluizen et al. .............. 428/426 |
| 5,326,730 | A | | 7/1994 | Dumbaugh et al. .............. 501/69 |
| 5,374,595 | A | | 12/1994 | Dumbaugh et al. .............. 501/66 |
| 5,432,130 | A | | 7/1995 | Rheinberger et al. .............. 501/32 |
| 5,968,857 | A | | 10/1999 | Pinckney .............. 501/10 |
| 6,248,678 | B1 | | 6/2001 | Pinckney .............. 501/10 |
| 6,319,867 | B1 | | 11/2001 | Chacon et al. .............. 501/66 |
| 6,555,232 | B1 | | 4/2003 | Aitken et al. .............. 428/428 |
| 2002/0023463 | A1 | * | 2/2002 | Siebers et al. .............. 65/99.5 |
| 2002/0151426 | A1 | | 10/2002 | Murata et al. .............. 501/66 |

FOREIGN PATENT DOCUMENTS

| | | |
|---|---|---|
| EP | 0 885 606 | 12/1998 |
| EP | 1 074 518 | 7/2001 |
| GB | 444132 | 3/1936 |
| GB | 459065 | 1/1937 |

(Continued)

OTHER PUBLICATIONS

D.J. DiGiovanni et al., "Structure And Properties Of Silica Containing Aluminum And Phosphorus Near the AlPO$_4$ Join", Journal of Non-Crystalline Solids, vol. 113, 1989, pp. 58-64.

J.F. MacDowell et al., "Immiscibility and Crystallization in Al$_2$O$_3$—SiO$_2$ Glasses", Journal of The American Ceramic Society, vol. 52, No. 1, pp. 17-25.

(Continued)

*Primary Examiner*—Michael Lebentritt
*Assistant Examiner*—Angel Roman
(74) *Attorney, Agent, or Firm*—Tina N. Thompson; Thomas R. Beall

(57) ABSTRACT

A family of glasses from the SiO$_2$—Al$_2$O$_3$—P$_2$O$_5$ ternary system exhibiting high strain point, transparency, and low coefficient of thermal expansion. The glasses have the following composition, expressed in mol percent and calculated from the glass batch on an oxide basis: 55-80 SiO$_2$, 12-30 Al$_2$O$_3$, and 2-15 P$_2$O$_5$.

18 Claims, 1 Drawing Sheet

FOREIGN PATENT DOCUMENTS

| | | |
|---|---|---|
| GB | 585282 | 2/1947 |
| GB | 869315 | 5/1961 |
| JP | 57-191251 | 11/1982 |
| JP | 61-261232 | 11/1986 |
| JP | 2001-26441 | 1/2001 |

OTHER PUBLICATIONS

R.M. Klein et al., "Glass Formation and Properties in the Aluminum Borophosphate System", Ceramic Bulletin, vol. 57, No. 2, 1978, pp. 199-216.

W.F. Horn et al., "The System $AlPO_4$—$SiO_2$", Glass and Ceramic Research Bulletin, vol. 26, Nos. 1-4, 1979, pp. 47-59.

* cited by examiner

HIGH STRAIN POINT GLASSES

RELATED APPLICATION

This application claims the benefit of priority from Provisional U.S. Patent Application No. 60/533,765, filed, Dec. 30, 2003, the content of which is incorporated herein by reference.

FIELD OF THE INVENTION

The invention relates to $Al_2O_3$—$P_2O_5$—$SiO_2$ glasses that are characterized by a high strain point, a low coefficient of thermal expansion and relatively low density.

BACKGROUND OF THE INVENTION

The materials of the present invention are most importantly substrate candidates for electronic devices. Several processes in the manufacture of electronic devices such as liquid crystal displays (LCDs), solar cells, electronics, microelectronics etc. include steps that are performed at extremely high temperatures. For example, active matrix LCDs employ an active device such as a diode or thin film transistor at each pixel thereby enabling high contrast and high response speed. Although many display devices currently utilize amorphous silicon (a-Si), the processing of which may be accomplished at temperatures under 450° C., polycrystalline-silicon (poly-Si) processing is preferred. Poly-Si has a much higher drive current and electron mobility thereby increasing the response time of the pixels. Further, it is possible, using poly-Si processing, to build the display drive circuitry directly oh the glass substrate. By contrast, a-Si requires discrete driver chips that must be attached to the display periphery utilizing integrated circuit packaging techniques. The most efficient poly-Si processing methods operate at temperatures of at least 800° C., such processes enable formation of poly-Si films having extremely high electron mobility (for rapid switching) and excellent TFT uniformity across large areas. This fabrication process typically consists of successive deposition and patterning of thin films using elevated temperature processes which result in the substrate being heated to temperatures in the range of 800° C. Fused silica has a sufficiently high strain point of 990-1000° C., but its thermal expansion coefficient (C.T.E.) is significantly lower than that of silicon (C.T.E. $5\times10^{-7}/°$ C. v. C.T.E. $37\times10^{-7}/°$ C.).

For other electronic devices, common, processing steps also require high temperature substrates to withstand processing. Most high level electronic fabrication requires annealing of the gate oxide and dopant activation. These processes occur at temperatures in excess of 800° C.

Even in the case of single crystal silicon (x-Si) fabrication techniques that employ a thin layer of single crystal silicon bonded to a substrate, high temperature substrates are required. Single, crystal silicon allows for even greater electron mobility than that achieved with poly-Si. The bonding step often requires high temperatures as well as the gate oxide and dopant activation steps previously described.

A need exists, then, for a glass that (1) has a high strain point (>800° C.), (2) does not require costly heat treatments after fabrication, (3) has a CTE match close to that of silicon, and (4) can be melted in a conventional melting unit. In addition, the glass will preferably be transparent to visible radiation and be chemically durable. These several qualities are needed in glasses for production of such varied products as flat panel displays, photovoltaic cells, photomasks, opto-magnetic disks and tubing and fiber applications that require stability at high temperatures.

Flat panel displays employ sheet glass that necessarily is transparent at visible wavelengths as well as into the ultra violet. It is also necessary that the glass sheet be adapted to production of a silicon layer on the glass surface. Initially, the silicon layer applied was amorphous silicon (a-Si). Fabrication of such devices required temperatures no greater than 350° C. Suitable glasses were readily available for use under these conditions.

The evolution from a-Si to poly-Si and x-Si as a coating material has presented a major challenge to use of a glass substrate. Poly-Si and x-Si coatings require much higher processing temperatures, in the range of 600-1000° C.

A primary purpose of the present invention is to provide a glass that has properties suited to production of a poly-Si or x-Si coating on its surface.

Another purpose is to produce a glass having a sufficiently high strain point to permit processing at 800-900° C.

A further purpose is to provide a glass that can be melted by conventional procedures, and that can provide a substrate for application of a high quality, poly-Si or x-Si film.

A still further purpose is to provide an electronic device, in particular, a flat panel display, and having a high-quality, poly-Si or x-Si, thin film on its surface.

Another purpose is to provide a novel glass family consisting essentially of $Al_2O_3$—$P_2O_5$—$SiO_2$, and optionally containing selected oxides such as alkali, alkaline earth, transition metal oxides, as well as oxides of the lanthanide series.

SUMMARY OF THE INVENTION

The invention resides in part in a family of ternary Aluminophosphosilicate glasses having a $Al_2O_3/P_2O_5$ molar ratio of greater than 1, a strain point in excess of 800° C., a melting temperature of 1650° C. or less, a water-white clarity, and a coefficient of thermal expansion of $5\text{-}40\times10^{-7}/°$ C.

The invention further resides in an electronic device having a poly-silicon film on a transparent, glass substrate, the substrate being an Alumino-phosphosilicate glass having a $Al_2O_3/P_2O$ ratio of greater than 1, a strain point in excess of 800° C., and a coefficient of thermal expansion of $5\text{-}40\times10^{-7}/°$ C.

DESCRIPTION OF THE INVENTION

Figure 1:
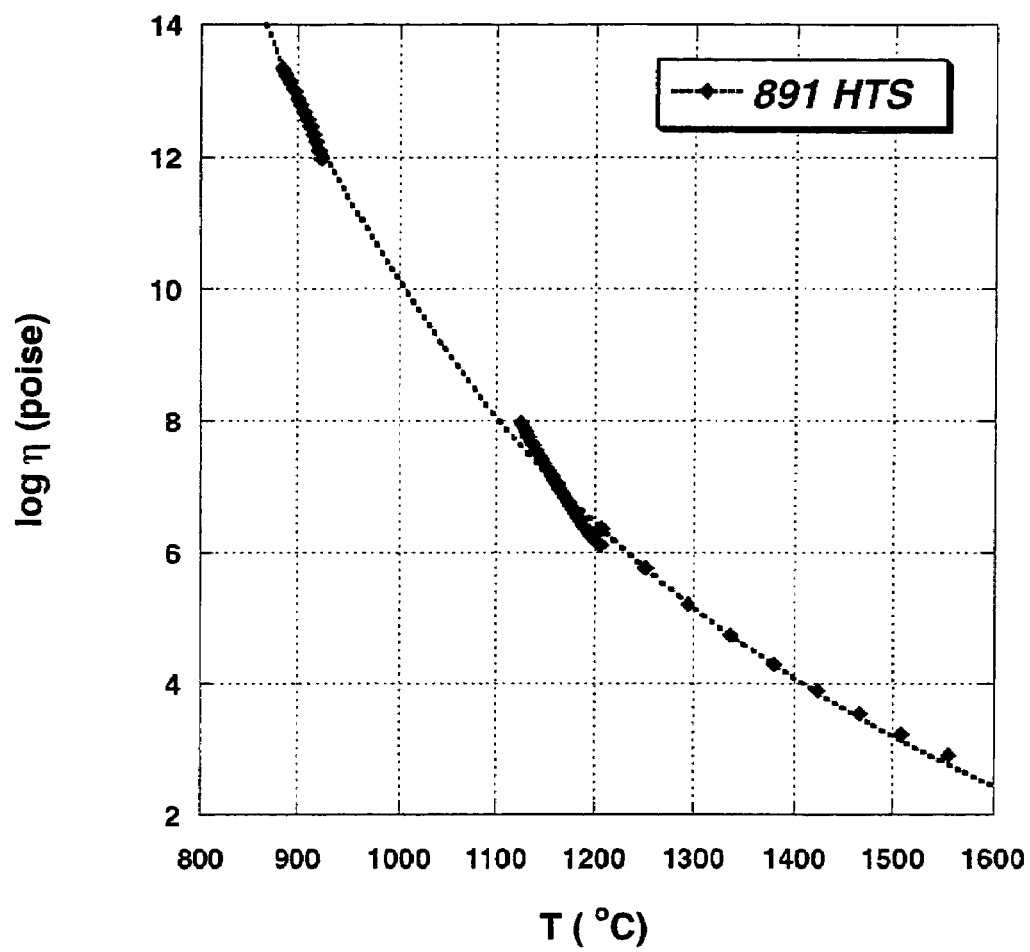
FIG. 1 demonstrates a viscosity curve for a preferred composition of the present invention.

Broadly stated, the present glasses have compositions falling within the following ranges, expressed in mole % as calculated from the glass batch on an oxide basis:

| | |
|---|---|
| $SiO_2$ | 55-80% |
| $Al_2O_3$ | 12-30% |
| $P_2O_5$ | 2-15% |
| RO | 0-15% |

Any number of fluxes (modifying oxides) may be added to the batch in order to impart desired characteristics. While these fluxes typically lower the strain point of the native glass, they are often necessary for any or all of the following purposes: raise the CTE, lower the liquidus temperature, obtain a preferred strain point for compaction, absorption at specific wavelengths, ease the melting, modify density, or modify durability. The effects that certain oxides have on the physical and chemical characteristics of glass are generally known. Fluxes may be added in amounts up to 15% or as limited by solubility. Modifying oxides may be selected from alkali metals, alkaline earth metals, transition metals as well as oxides of the lanthamide series. Specific examples include $Y_2O_3$, $ZrO_2$, $HfO_2$, MgO, CaO, SrO, BaO $As_2O_3$, $SnO_2$, $Li_2O$, $La_2O_3GeO_2$, $Ga_2O_3$, $Sb_2O_3$, $Na_2O$, $K_2O$, $Rb_2O$, $Cs_2O$, BeO, $Sc_2O_3$, $TiO_2$, $Nb_2O_5$, ZnO, CdO, PbO, $Bi_2O_3$, $Gd_2O_3$, $Lu_2O_3$ and/or $B_2O_3$. Therefore, for purposes of this invention, R shall be Mg, Ca, Y, Sr, Zr, Hf, As, Sn, Li, La, Ge, Ga, Sb or any other element that fits the definition of appropriate modifiers above.

These glasses have the following characteristic properties:

| | |
|---|---|
| Strain Point | >800° C. |
| CTE | >8 × $10^{-7}$/° C. |
| Melting | <1650° C. |
| Density | >2.2 g/cm$^2$ |

A preferred embodiment has compositions within the above identified ranges, again in mol % on an oxide basis, as calculated from the glass batch:

| | |
|---|---|
| $SiO_2$ | 60-70% |
| $Al_2O_3$ | 15-25% |
| $P_2O_5$ | 5-10% |
| RO | <7% |

TABLES I and II, below, set forth several compositions, in mol % on an oxide basis, illustrative of compositional ranges of the invention. The actual batch ingredients may comprise any materials, either oxides or other compounds, which when melted together with the other batch components, will be converted into the desired oxide in the proper proportions.

The batch ingredients were compounded, tumble mixed together thoroughly to aid in producing a homogeneous melt, and charged into platinum crucibles. After placing lids thereon, the crucibles were moved into furnaces operating at temperatures of 1600-1650° C. The crucibles were then removed after approximately 16 hours and the melt so-formed cast into a steel mold. The glass patty was then removed from the mold and placed into an annealing furnace at a temperature at the annealing point of the glass (approximately 900° C. The glasses were then removed from the annealing furnace and allowed to cool.

Tables I and II also list measurements of several physical and chemical properties determined on the glasses in accordance with techniques conventional in the glass art. Thus, the linear coefficient of thermal expansion (CTE) over the temperature range 0-300° C. is expressed in terms of ×$10^{-7}$/° C. and determined by dilotometry; the softening point is expressed in ° C. as determined by parallel plate viscometry; and strain point and annealing temperature are expressed in ° C. as determined by beam bending viscometry. The durability in HCl was determined by measuring the weight loss (mg/cm2) after immersion in a bath of aqueous 5% by weight HCl at 95° C. for 24 hours. The liquidus temperature was measured utilizing a standard gradient furnace test. The melting temperature is the temperature at which the glass melt demonstrates a viscosity of 300 poises.

As can be observed from the Tables, not all tests were performed for all compositions.

TABLE I

| Series | 891 | 891 | 891 | 891 | 891 | 891 | 891 | 891 |
|---|---|---|---|---|---|---|---|---|
| Code | HIM | HIN | HIP | HIQ | HIS | HIT | HJB | HOE |
| $SiO_2$ | 71 | 71 | 70 | 70 | 69 | 69 | 68 | 70 |
| $Al_2O_3$ | 21 | 22 | 22 | 23 | 22 | 23 | 24 | 18 |
| $P_2O_5$ | 8 | 7 | 8 | 7 | 9 | 8 | 8 | 7 |
| $Y_2O_3$ | | | | | | | | |
| $ZrO_2$ | | | | | | | | 5 |
| Softening Pt. (° C.) | | | 1197 | 1178 | 1203 | 1185 | | |
| Annelaing Temp. (° C.) | 911 | 922 | 911 | 917 | | 927 | 920 | 912 |
| Strain Pt. (° C.) | | 865 | | 864 | | 860 | | 857 |
| Melting (° C.) | | | | | | | | |
| $CTE_{RT-300}$ (× $10^{-7}$/° C.) | | | 9.9 | 10.1 | 8.6 | 10.1 | | 12.5 |
| Density (g/cm$^2$) | 2.325 | 2.347 | 2.337 | 2.353 | 2.326 | 2.35 | | |
| UV Cutoff λ (nm) | | | 332 | 330 | 337 | 333 | | |
| Durability (mg/cm$^2$) | | | 0.49 | | | | | 0.5 |
| Refractive Index | 1.486 | 1.491 | 1.487 | 1.492 | 1.485 | 1.491 | | |

TABLE II

| Series Code | 891 HTS | 891 HTB | 891 HTP | 891 HVP | 891 HTU | 891 HZC | 891 HXA | 891 IAL |
|---|---|---|---|---|---|---|---|---|
| $SiO_2$ | 65.6 | 70 | 65.6 | 62.1 | 65.6 | 68 | 65 | 65 |
| $Al_2O_3$ | 21.8 | 18 | 21.9 | 20.7 | 21.8 | 19 | 22 | 22 |
| $P_2O_5$ | 7.6 | 7 | 7.6 | 7.2 | 7.6 | 8 | 8 | 8 |
| $Y_2O_3$ | 2.5 | | | | | 2.5 | 2.5 | 2.5 |
| $ZrO_2$ | 2.5 | 3.5 | | | 2.5 | 2.5 | 2.5 | |
| MgO | | 1.5 | | | | | | |
| BaO | | | | 5 | 10 | | | |
| $La_2O_3$ | | | | | 2.5 | | | 2.5 |
| Softening Pt. (° C.) | 1139 | 1181 | 1160 | | 1111 | | 1135 | |
| Anneal Temp (° C.) | 870 | | 885 | | 879 | 900 | 886 | |
| Strain Pt. (° C.) | 846 | | 824 | | 829 | 851 | 837 | |
| Melting (° C.) | 1650 | | | | | | | |
| $CTE_{RT-300}$ ($\times 10^{-7}$/° C.) | 18.2 | 14.2 | 20.6 | 34.3 | 19.6 | 18.4 | 16.8 | 16.8 |
| Liquidus Temp (° C.) | | | | | | 1450 | 1525 | 1460 |

The strain points are somewhat lower than fused silica. However, they are substantially higher than available, conventionally melted glasses, and are quite adequate for their intended purpose. It should be noted that the glass transition temperatures for the ternary oxides are all greater than 900° C., which in turn indicates strain points all in excess of 850° C.

For several compositions, the liquidus temperature is below 1500° C. A preferred composition has a liquidus temperature of 1450° C. (891 HZC).

FIG. 1 is a curve demonstrating the viscosity of a preferred composition (891 HTS) over a wide range of temperatures.

As can be further appreciated, the low thermal expansion characteristics of these glasses make them excellent candidates for technological situations that require refractoriness and thermal shock resistance.

In situations where the glass of the present invention is to be utilized as a substrate supporting a thin layer of silicon it may be necessary to coat the surface with a barrier layer that will protect the silicon from becoming contaminated by the glass. Such barrier layers are common and known to those of skill in the art. Examples of suitable barrier layers include silica as well as silicon nitride.

In other applications, it may be advantageous to color the glass. Addition of transition metal oxides are known to add color to the glass. For example small amounts of cobalt are known to impart a blue or gray color to the glass.

While the invention has been described with respect to a limited number of embodiments, those skilled in the art, having benefit of this disclosure, will appreciate that other embodiments can be devised which do not depart from the scope of the invention disclosed herein. The scope of the invention is defined by the attached claims.

We claim:

1. A glass composition comprising the following composition when calculated in mol percent and calculated from the batch on an oxide basis: 55-80 $SiO_2$, 12-30 $Al_2O_3$, and 5-15 $P_2O_5$, wherein the glass is a transparent glass.

2. The glass composition of claim 1 further comprising the following composition when calculated in mol percent and calculated from the batch on an oxide basis: 50-70 $SiO_2$, 15-25 $Al_2O_3$, and 5-10 $P_2O_5$.

3. The glass composition of claim 1 having a linear coefficient of thermal expansion of 5-40×$10^{-7}$/° C. over a temperature range of 0 to 300° C.

4. The glass composition of claim 1 having a melting temperature of less than approximately 1650° C.

5. The glass composition of claim 1 having a strain point greater than 800° C.

6. The glass composition of claim 5 having a strain point of at least 850° C.

7. The glass composition of claim 1 further comprising a modifying oxide.

8. The glass composition of claim 7 further comprising at least one modifying oxide selected from the group consisting of $Y_2O_3$, $ZrO_2$, $HfO_2$, MgO, CaO, SrO, BaO, $As_2O_3$, $SnO_2$, $Li_2O$, $La_2O_3$ $GeO_2$, $Ga_2O_3$, $Sb_2O_3$, $Na_2O$, $K_2O$, $Rb_2O$, $Cs_2O$, BeO, $Sc_2O_3$, $TiO_2$, $Nb_2O_5$, $Ta_2O_5$, ZnO, CdO, PbO, $Bi_2O_3$, $Gd_2O_3$, $Lu_2O_3$ and/or $B_2O_3$ in a total amount not exceeding 15 mol %.

9. The glass composition of claim 1 further comprising at least one modifying oxide selected from the group consisting of $Y_2O_3$, $ZrO_2$, $HfO_2$, MgO, CaO, SrO, BaO, $As_2O_3$, $SnO_2$, $Li_2O$, $La_2O_3$ $GeO_2$, $Ga_2O_3$, $Sb_2O_3$, $Na_2O$, $K_2O$, $Rb_2O$, $Cs_2O$, BeO, $Sc_2O_3$, $TiO_2$, $Nb_2O_5$, $Ta_2O_5$, ZnO, CdO, PbO, $Bi_2O_3$, $Gd_2O_3$, $Lu_2O_3$ and/or $B_2O_3$ in a total amount not exceeding 7 mol %.

10. The glass composition of claim 1 having a density exceeding 2.2 g/cm$^3$.

11. The glass composition of claim 1 having a glass transition temperature exceeding 850° C.

12. The glass composition of claim 10 having a glass transition temperature exceeding 900° C.

13. An aluminophosphosilicate glass exhibiting a density less than about 2.5 g/cm$^3$ and a strain point greater than approximately 800° C., the glass comprising the following composition as calculated in a mol percent on an oxide basis: 55-80 $SiO_2$, 12-30 $Al_2O_3$, and 2-15 $P_2O_5$, wherein the glass is a transparent glass.

14. The glass composition of claim 13 further exhibiting a melting temperature of approximately 1650° C. or less, a water-white clarity, and a coefficient of thermal expansion of 8-40×$10^{-7}$/° C.

15. A glass substrate for an electronic display device comprising the following composition when calculated in mol percent and calculated from the batch on an oxide basis: 55-80 $SiO_2$, 12-30 $Al_2O_3$, and 5-15 $P_2O_5$, wherein the glass substrate is a transparent glass substrate.

16. The glass substrate of claim 14 further comprising the following composition when calculated in mol percent and calculated from the batch on an oxide basis: 50-70 $SiO_2$, 15-25 $Al_2O_3$, and 5-10 $P_2O_5$.

17. A glass composition comprising the following composition when calculated in mol percent and calculated from the batch on an oxide basis: 55-80 $SiO_2$, 12-30 $Al_2O_3$, and 2-15 $P_2O_5$ wherein said glass composition is free of alkaline earth metals, wherein the glass is a transparent glass.

18. A glass composition comprising the following composition when calculated in mol percent and calculated from the batch on an oxide basis: 55-80 $SiO_2$, 12-30 $Al_2O_3$, and 2-15 $P_2O_5$ and having a strain point of at least 850° C. wherein the glass is a transparent glass.

* * * * *